(No Model.)　　　　　　　　H. D. SABIN.　　　　2 Sheets—Sheet 1.
CULTIVATOR.

No. 515,843.　　　　　　　　　　　　　Patented Mar. 6, 1894.

Witnesses:

Inventor:
Horace D. Sabin.
by his Attorney.

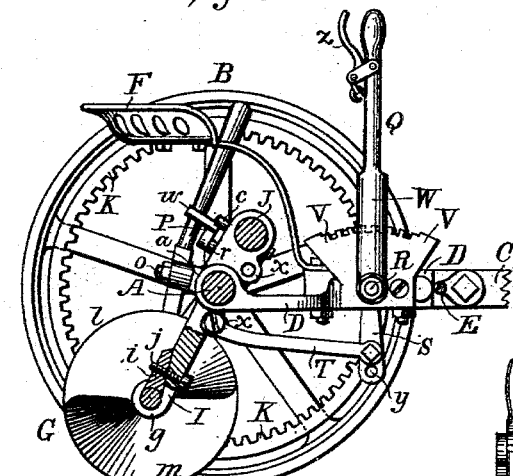
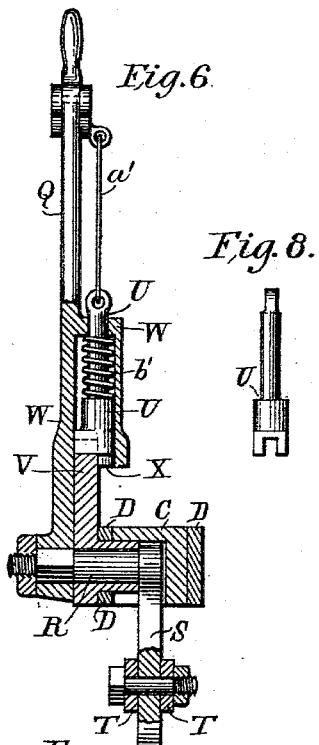
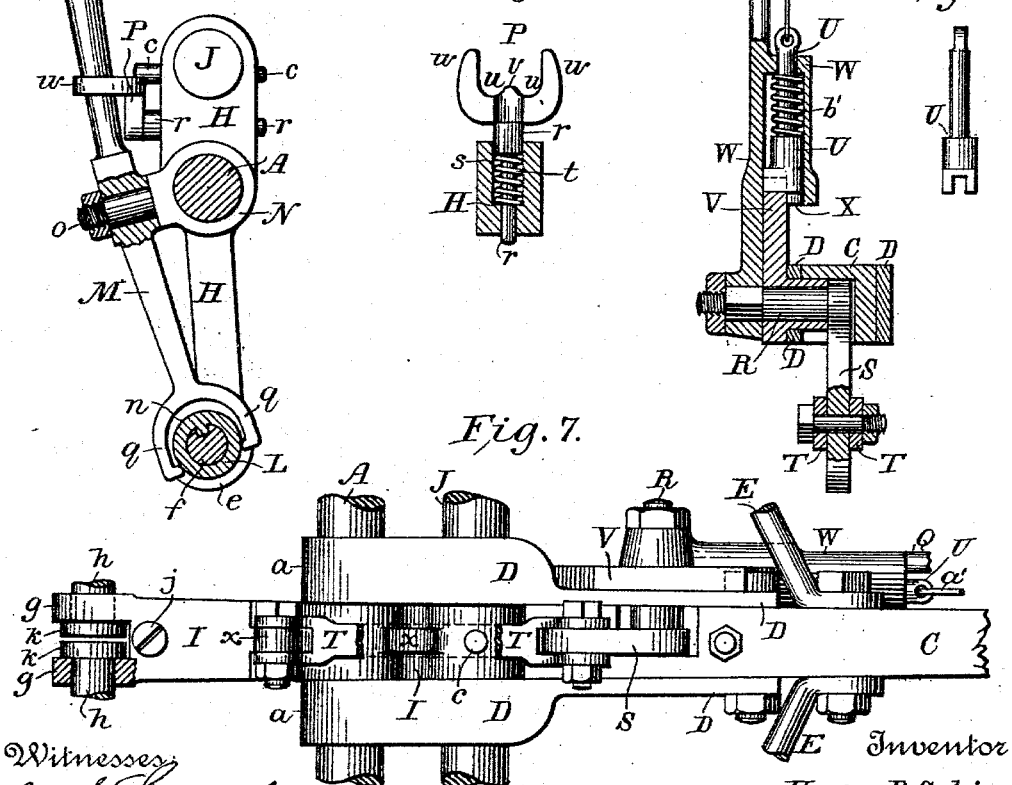

UNITED STATES PATENT OFFICE.

HORACE D. SABIN, OF XENIA, OHIO.

CULTIVATOR.

SPECIFICATION forming part of Letters Patent No. 515,843, dated March 6, 1894.

Application filed May 10, 1893. Serial No. 473,695. (No model.)

*To all whom it may concern:*

Be it known that I, HORACE D. SABIN, of Xenia, in the county of Greene and State of Ohio, have invented certain new and useful Improvements in Cultivators, of which the following is a specification.

This invention consists in a wheeled agricultural machine which can be used as a pulverizer, clod crusher, harrow, plow, or cultivator, as may be desired, the action of the machine being to loosen and pulverize the earth and thereby prepare the same for planting or to keep the earth cultivated after being planted. Since the action of the machine is, generally speaking, upon the upper surface layer of the soil which is to be reduced to a loosened and pulverized condition for cultivating purposes, the machine may be appropriately and conveniently termed a "cultivator" and hence in the following description this term will be used in referring to the machine.

The present improved cultivator is a "riding" machine provided with wheels, and has a rider's seat, and is propelled, as by being drawn by horses or other draft animals.

The chief characteristic feature of the invention consists in a power-driven rotary spiral or auger-shaped cultivating element or scarifier rotatively mounted upon the cultivator and positively driven by connection with the drive-wheels of the cultivator. More than one, preferably two, of the scarifiers are employed on the same machine. The driven scarifier is mounted upon a movable frame supported by and movable upon the main frame of the cultivator so that the scarifier may be adjusted vertically with reference to the surface of the ground in order to pulverize, loosen, and scarify the same to different depths, and to enable the scarifier to be raised clear above the surface of the ground when not in active operation, as when driving to and from the territory to be cultivated. Means are also provided for throwing the scarifier out of gear when not in use.

The invention includes the improved instrumentalities for effecting these purposes, and other details incidental thereto, which will be hereinafter more fully set forth.

The present improvements are illustrated in the accompanying drawings, wherein—

Figure 1:
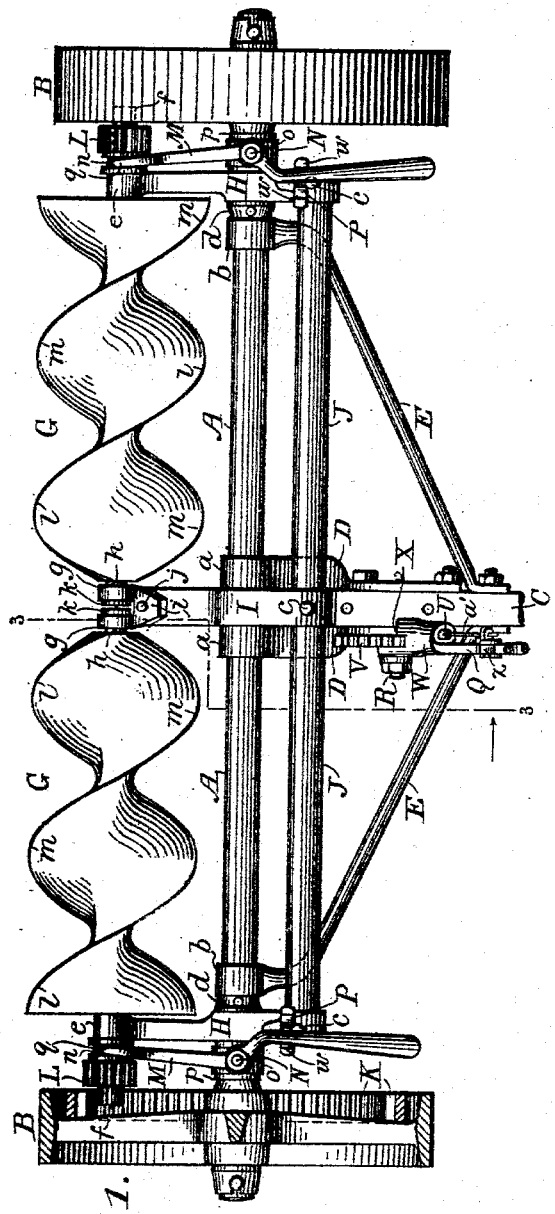
Figure 2:
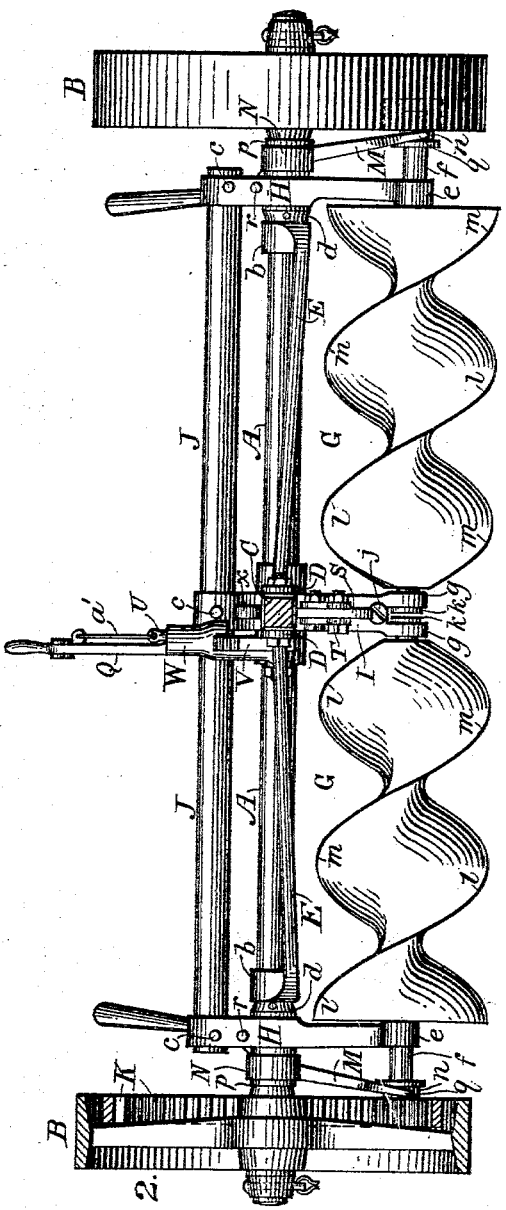

Figure 1 is a plan view of the cultivator, showing the scarifiers in their most elevated position, and omitting the driver's seat in order not to confuse the illustration. Fig. 2 is a front view thereof, showing the scarifiers in their lowermost position. Fig. 3, is a vertical cross-section in a plane indicated substantially by the line 3—3 in Figs. 1, and 2. Figs. 4, to 8, are detail views.

A, is the axle of the cultivator, and B, B, are the drive or traction wheels mounted thereupon. The draft-pole C, is connected with the middle part of the axle by strap irons D, D, bolted to the pole and having collars *a, a*, which embrace the axle, and is connected with the outer ends of the axle by diagonal brace-rods E, E, bolted at their forward ends to the pole and having collars *b b* which embrace the axle.

The axle A, pole C, and their connections D, E, constitute (in the construction shown) the cultivator-frame.

The driver's seat F, of a known construction, is secured to the pole C.

In the illustrated machine, there are two of the rotary spiral scarifiers G, G, which extend horizontally in line with each other, parallel with the axle A, and which are rotatively mounted independently of each other in an adjustable tilting scarifier frame. This tilting scarifier frame comprises three cross-bars H, H, I, which are connected at their forward ends by a longitudinal rod J, located parallel with the axle A, above and in front of the same. The rod J, extends through apertures in the forward ends of the bars H, H, I, and is fastened to said bars by key-pins *c c*. At their middle portions, but nearer their upper than their lower ends, each of the cross-bars H, H, I, has a central aperture whereby each bar is slipped over the axle A, and turns concentrically thereupon. Since the upper ends of the several cross-bars are rigidly connected together by the rod J, they with said rod constitute a tilting scarifier frame swinging concentrically upon the axle A. The middle cross-bar I, is located between the two straps D, D, and the outer cross-bars H, H, are located beyond and outside of the collars *b b* of the diagonal braces E, E, collars *d d* fixed to the axle being interposed between the collars *b b* and the bars H, H. The tilting scarifier frame is thus held in place on the axle, and is prevented from longitudinal movement thereupon. The two spiral scarifiers G, G, are journaled in the lower ends of the cross-bars H, H, I, each being journaled independently between the middle bar I, and one of the outer bars H.

To furnish journal bearings for the scarifiers, each outer bar H has at its extreme lower end a sleeve $e$, through which passes, and in which turns, the outer trunnion $f$ of one of the scarifiers G. The middle bar I, has at its extreme outer end two separated open bearings $g$ $g$ for the inner trunnions $h$ $h$ of the scarifiers G G respectively. The trunnions $h$ $h$ are held in the bearings $g$ $g$ by a removable bearing block $i$ secured to the bar I by screw $j$. The spiral scarifiers G G are held from longitudinal movement in their bearings by flanges $k$ $k$ on their inner trunnions $h$ $h$, which are located in the space between the bearings $g$ $g$. The flanges $k$ $k$ come in contact with the bearings $g$ $g$ if the scarifiers G G are thrust outwardly, and they abut against each other if the scarifiers G G are thrust inwardly.

The two spiral scarifiers G G, as illustrated, are just alike. Each is composed, with its trunnions $f$ $h$, of a single solid piece of metal cast or otherwise formed of the proper shape. The spiral is a continuous screw or auger spiral, and has two continuous spiral cutting edges or blades $l$ $m$. Each blade or cutting edge is practically perpendicular to a plane parallel with the axis of the scarifier G and touching the blades or cutting edges.

Each spiral scarifier G, is positively driven by power by being geared by multiplying gearing to the drive-wheel on its side of the machine. Each drive wheel has an internal drive gear K, which meshes with a driven pinion L on the outer trunnion $f$ of the adjacent scarifier G, and outside of the cross-bar H. This arrangement of gearing rotates the scarifiers G G in the same direction as the traction wheels B, B, rotate, and since the pinions L have a small diameter as compared with the gears K (whereby multiplying gearing is supplied) the peripheral velocity of the scarifiers G greatly exceeds that of the wheels B.

In order that the scarifiers G, G, may be thrown out of operation when desired, means are employed for clutching and unclutching the pinions L, and gears K. To this end each pinion L, is capable of sliding longitudinally on its trunnion $f$, being feathered thereto, and its hub has a peripheral clutch-groove $n$.

M, is the corresponding clutch-lever. This clutch lever is pivoted near its middle to a fulcrum stud $o$, carried by a sleeve N which loosely embraces the axle between the adjacent outer cross-bar H on one side and a thrust collar $p$ next the wheel hub on the other side. At its lower end the clutch lever M has a fork $q$ co-operating with the clutch-groove $n$, and at its forward end it has an operating handle. By manipulating the clutch-lever, the pinion L can be moved into and out of gear with the gear K.

In order to lock each clutch-lever in its two positions, a clutch-bar-catch P, is employed. This catch P, is carried by the cross-bar H adjacent to the clutch-lever, and it is yieldingly and pivotally mounted upon said cross-bar. Said catch has a stem $r$, which turns in a socket $s$ in the bar H, and a spring $t$, interposed between a seat in the socket and a shoulder on the stem $r$, presses the catch outwardly. The catch has two holding notches $u$ $u$ separated by a ridge $v$ and having outside stops $w$ $w$. The handle end of the lever is bent so that a portion thereof lies over the catch and is adapted to be held in either of the notches $u$ $u$, the spring $t$ maintaining the lever in its caught positions. The catch is held in place in its socket solely by the clutch-lever. The turning of the catch in its socket and the yielding of the catch on its spring enable the clutch-lever to be easily manipulated.

In order to raise and lower the scarifiers so as to enable them to penetrate the earth at different depths, and also to enable the scarifiers to be lifted entirely free from the ground when desired, the scarifier-frame is made adjustable, and means are provided for tilting said frame and maintaining it in its different positions.

Q, is the operating lever for effecting the adjustment of the scarifier-frame, and it is carried by a rock-shaft R, which carries a downwardly-depending crank S projecting down between the straps D, D. This crank is connected by a link T with the scarifier-frame. Conveniently the link is connected with the middle bar I of the scarifier-frame. The link may be connected with bar I either above or below the axis of oscillation of the scarifier-frame, and to enable this to be done the bar I has ears $x$ $x$. When the link is connected with the upper ear $x$ it extends up between the straps D, D.

To enable the extent of oscillation of the scarifier-frame to be adjusted, the crank S has a plurality of attaching eyes $y$ $y$ for connection with the link T. The upper or handle end of the operating lever Q, is within convenient reach of the occupant of the driver's seat. By manipulating said lever the scarifiers may be raised or lowered as desired. It will be observed that the connection between the link T, and the bar I, is at the middle of the scarifier frame, and that the link extends directly forward so that there is no side strain.

To enable the scarifier frame to be maintained in its different positions, a dog U, carried by the lever Q, co-operates with a fixed rack V, on the cultivator frame. The dog is operated by a thumb lever $z$ and link $a'$. The dog slides in a sleeve W, formed integrally with the lever Q, and a spring $b'$ causes the dog to engage with the rack notches. In order to maintain the lever in proper relation to the rack, it has a projecting nose X which embraces the rack on the opposite side from the lever.

All of the parts of the cultivator are preferably made of metal, except the pole C, which is preferably made of wood.

In operation the scarifiers are set so as to penetrate the earth to the desired depth, and they are geared to the drive wheels. The cultivator is then propelled, and the scarifiers are rotated. Since the peripheral velocity of the scarifiers is greater than the rate of advance of the cultivator, it follows that the entire surface of the soil is acted upon by the scarifiers and is thoroughly and evenly loosened. The earth is not only cut into by the continuous spiral blades of the scarifiers, but is moved laterally also, so that its pulverization is insured. Should any stones be encountered, the spiral blades push them to one side instead of riding over them, so that the blades are not injured thereby.

Many modifications can be made in embodying the principles of the invention, and I have illustrated only what I deem to be the best mode of the application thereof. As instances of feasible modifications which readily suggest themselves, I may mention the following:

It is not necessary that the scarifiers should rotate in the same direction as the cultivator wheels. They may rotate in the opposite direction, which is readily effected by substituting external gears for the internal gears K.

In the illustrated construction, the spiral blades on both scarifiers twist in the same direction, but the twist may be in opposite directions, and the blades may be arranged to throw the dirt either out from the middle or toward the middle of the machine. Or each scarifier may have two sets of spiral blades twisted in opposite directions, either toward or from each other.

Each scarifier, as shown, has two spiral blades, but it may have but one, or more than two, and the pitch of the spirals may be modified, as also may be the angle at which each blade enters the ground.

In any case it is only essential that the scarifier should have a continuous spiral blade, and that it should be positively driven or rotated by connection with a driving mechanism, such as the traction wheels of the cultivator.

The other auxiliary features of the cultivator are desirable and I preferably employ them, but they are not essential to the operation of the scarifiers, and many of them may be used in relations other than with the scarifiers.

I claim as my invention—

1. A cultivator having a positively-driven rotary scarifier with a continuous laterally thrusting spiral blade, in combination with mechanism for driving said scarifier, substantially as set forth.

2. In a cultivator, a positively-driven rotary scarifier with a continuous laterally thrusting spiral blade, in combination with a traction-wheel geared to said scarifier to rotate the same, substantially as set forth.

3. In a cultivator, a positively-driven rotary scarifier with a continuous spiral blade, in combination with a traction-wheel, and multiplying gearing between said wheel and said scarifier for rotating said scarifier at a higher speed than the traction wheel, substantially as set forth.

4. A cultivator having a plurality of positively-driven scarifiers each with a continuous spiral blade, in combination with mechanism for driving said scarifiers, substantially as set forth.

5. A cultivator having a plurality of positively-driven rotary scarifiers each with a continuous laterally thrusting spiral blade, in combination with mechanism for driving said scarifiers independently of each other, substantially as set forth.

6. In a cultivator, two independently-rotating positively-driven scarifiers in line with each other, each having a continuous laterally thrusting spiral blade, in combination with the two traction wheels of the cultivator geared to said scarifiers respectively, substantially as set forth.

7. The scarifier-frame consisting of the three bars H, H, I, pivotally hung upon the axle of the cultivator and prevented from sliding thereupon by suitable devices, and the longitudinal rod connecting the forward ends of the said bars at one side of the axle, in combination with the scarifiers journaled in the lower ends of said bars on the opposite side of said axle, substantially as set forth.

8. The scarifier-frame having a middle bar formed with two open and separated bearings $g$ $g$, and a removable bearing-block $i$, in combination with the two scarifiers the inner trunnions of which are journaled in said bearings $g$ $g$ respectively, and said scarifiers having end flanges $k$ $k$ located in the space between said bearings $g$ $g$, substantially as set forth.

9. The swiveled clutch-lever catch longitudinally yieldingly and rotatively mounted upon its support, in combination with the pivoted clutch-lever co-operating with said catch, substantially as set forth.

10. The scarifier-frame having socket $s$, the catch P having stem $r$ turning in said socket and having holding-notches $u$ $u$, and the spring $t$ pressing said catch outwardly, in combination with the clutch-lever co-operating with said catch, substantially as set forth.

In witness whereof I have hereunto signed my name in the presence of two subscribing witnesses.

HORACE D. SABIN.

Witnesses:
JAMES A. KELLY,
LEWIS H. WHITEMAN.